United States Patent [19]
Ibara et al.

[11] Patent Number: 5,613,468
[45] Date of Patent: Mar. 25, 1997

[54] FUEL INJECTION CONTROL

[75] Inventors: Takeru Ibara; Yoshihiko Moriya; Yu Motoyama, all of Iwata, Japan

[73] Assignee: Yamaha Hatsudoki Kabushiki Kaisha, Iwata, Japan

[21] Appl. No.: 634,943

[22] Filed: Apr. 19, 1996

[30] Foreign Application Priority Data

Apr. 20, 1995 [JP] Japan .................. 7-095309

[51] Int. Cl.⁶ .................................................. F02D 41/04
[52] U.S. Cl. ................. 123/73 A; 123/73 V; 123/184.54
[58] Field of Search .................. 123/184.54, 317, 123/318, 73 A, 73 C, 73 V, 65 V

[56] References Cited

U.S. PATENT DOCUMENTS

| | | | |
|---|---|---|---|
| 4,461,260 | 7/1984 | Nonaka et al. | 123/73 A |
| 4,699,109 | 10/1987 | Hensel | 123/478 |
| 4,932,371 | 6/1990 | Albertson et al. | 123/73 SP |
| 4,955,341 | 9/1990 | Trombley et al. | 123/73 C |
| 4,989,554 | 2/1991 | Kushida et al. | 123/73 A |
| 5,009,211 | 4/1991 | Kushida et al. | 123/491 |
| 5,050,564 | 9/1991 | Suzuki et al. | 123/492 |
| 5,073,133 | 12/1991 | Inoue | 440/1 |
| 5,113,829 | 5/1992 | Motoyama | 123/73 A |
| 5,134,984 | 8/1992 | Nonaka et al. | 123/73 C |
| 5,219,398 | 6/1993 | Nonaka et al. | 123/73 R |
| 5,231,958 | 8/1993 | Takahashi et al. | 123/73 A |
| 5,257,607 | 11/1993 | Gillespie | 123/73 C |
| 5,408,872 | 4/1995 | Nonaka | 73/118.2 |
| 5,450,830 | 9/1995 | Katoh | 123/73 A |

*Primary Examiner*—David A. Okonsky
*Attorney, Agent, or Firm*—Knobbe, Martens, Olson & Bear LLP

[57] ABSTRACT

A fuel injection system for an engine having a reed type valve in the induction system. The injection system is designed and controlled so that the fuel that is injected is injected substantially entirely before the reed type valve is closed. The time of closing of the reed type valve is determined either by measuring the pressure differential or by recording data indicative of the valve closing in response to various engine running conditions such as speed and/or load.

27 Claims, 5 Drawing Sheets

5,613,468

FUEL INJECTION CONTROL

BACKGROUND OF THE INVENTION

This invention relates to a fuel injection control for internal combustion engines and more particularly to an improved fuel injection control for engines embodying reed type check valves in the induction passages.

In many forms of internal combustion engine induction systems, there are employed reed type check valves in the intake passage. The use of such valves is commonly resorted to in two-cycle crankcase compression engines but this principle also has been applied to four-cycle engines even those having poppet valves. The function of the reed-type valve is to permit flow through the induction system toward the engine combustion chamber but to preclude flow in the opposite direction. This is almost essential in a two-cycle crankcase compression engine in order to permit the charge to be compressed in the crankcase chambers when the piston is moving downwardly in the cylinder bore. However, the principle is also utilized, as noted above, at times in four-cycle engines having conventional valves downstream of the check valves, to achieve a similar function.

One disadvantage with the use of the reed type check valve is that the fuel tends to continue to flow in the intake passage at a time when the reed type valve is closed. For example, with a carbureted engine and when the reed type valve is open, the fuel will be discharged front the discharge nozzles of the carburetor and will flow toward the reed type valve. However, the pressure differential which causes the valve to close may occur at a time when the fuel is still flowing. Thus, although the air flow may be stopped by the closure of the valve, the fuel because of its heavier density will continue to flow and will impinge upon the valve.

This phenomenon has a number of disadvantages. First, since the fuel which was intended for the combustion chamber is precluded from entering it, it may be necessary to enrich the mixture to provide the desired fuel/air ratio in the combustion chamber to make up the fuel which does not reach the combustion chamber. Although this fuel may flow into the intake passage upon the next opening of the reed type valve, its atomized state will not longer exist and there is an increased likelihood that the fuel will adhere to the walls of the intake passage and merely accumulate there. This accumulated fuel at times will also mix with the air flowing into the combustion chamber and thus the air/fuel ratio will become erratic.

These problems are not limited to carbureted engines. If a fuel injector is employed that is upstream of the reed type valve, the injected fuel also may impinge upon and condense on the reed type valve if it closes before all of the fuel has passed into the combustion chamber. Thus, the same detrimental effects aforenoted will occur with fuel-injected engines. The problem is more acute with fuel-injected engines, in fact. The reason for this is that the injection timing may be such that it occurs when the valve is closed or continues after the valve is closed. Since the injection cycle is not dependent upon air flow, the fuel flow will not be automatically stopped as the air flow decreases as it will with a carbureted engine.

It is, therefore, a principle object of this invention to provide an improved fuel injected internal combustion engine that employs reed valves in the intake passage and which will ensure against the adhesion of significant amounts of fuel on the reed type valve.

It is a further principle object of this invention to provide an improved fuel injection system and control for an engine having reed type valves in the intake system.

SUMMARY OF THE INVENTION

This invention is adapted to be embodied in an engine having an induction passage that serves a combustion chamber for delivering an air charge thereto. A reed type valve is positioned in the induction passage for controlling the flow through the induction passage in response to pressure differences. A fuel injector is provided for injecting fuel into the induction passage upstream of the reed type valve. Control means sense engine running conditions and provide for a fuel injection amount that is optimal for those running conditions.

In accordance with an apparatus for practicing the invention, the fuel injection control is operated in such a manner so that the fuel injection is substantially completed at the time the reed type valve closes.

In accordance with a method for practicing the invention, the injection control terminates injection at a time which is not substantially later than the time when the reed type valve closes.

DETAILED DESCRIPTION OF THE PREFERRED EMBODIMENTS OF THE INVENTION

Figure 1:
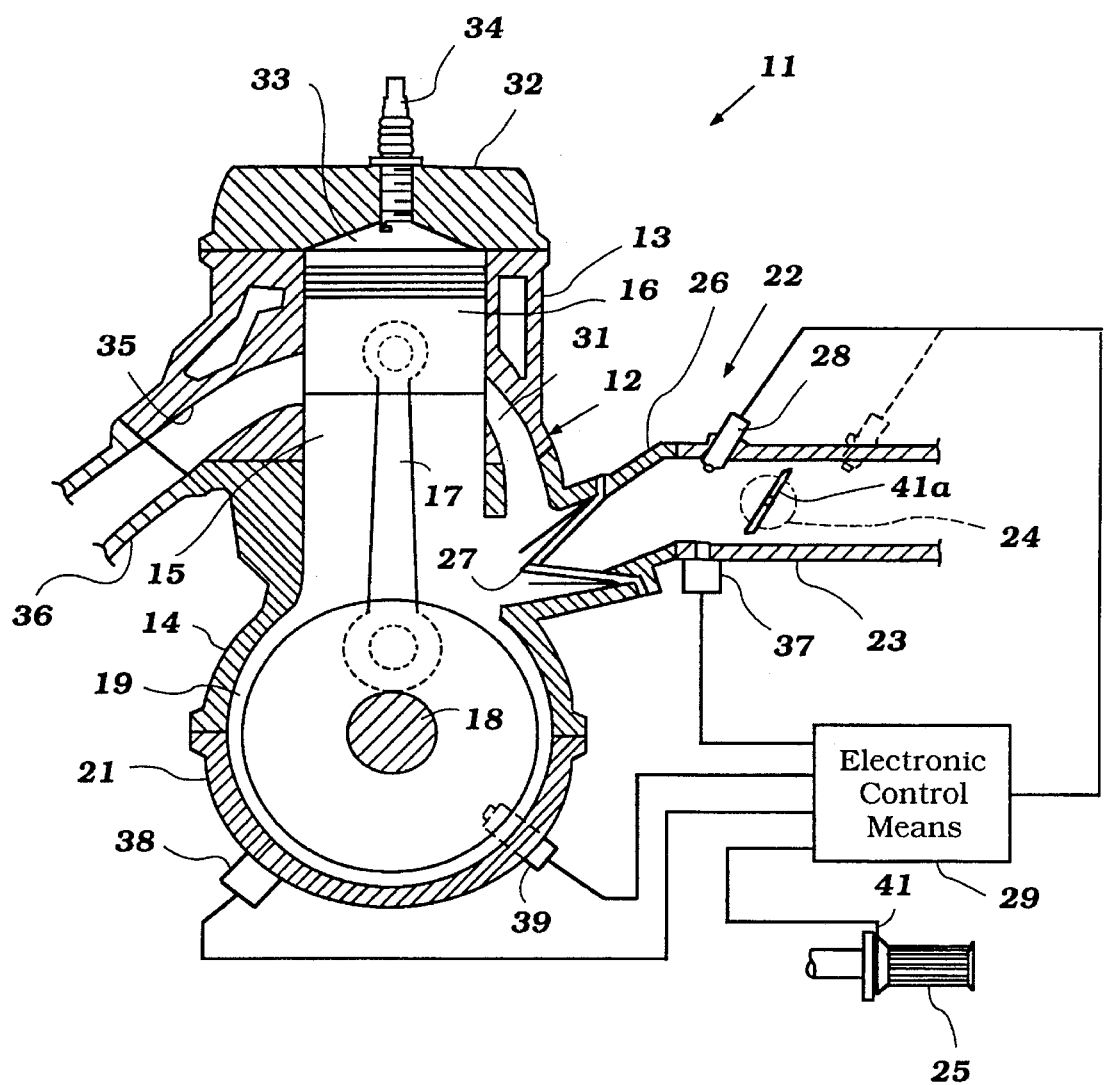
FIG. 1 is a partially schematic, cross-sectional view of an internal combustion engine constructed in accordance with an embodiment of the invention.

Referring now in detail to the drawings and initially to FIG. 1, an internal combustion engine constructed in accordance with an embodiment of the invention is indicated generally by the reference numeral 11. The engine 11 is a two-stroke, crankcase compression type engine with a single cylinder, though it should be readily apparent to those skilled in the art how the invention may be employed with engines of various other configurations.

The engine 11 is composed of an engine body or cylinder block 12 that consists of upper and lower block portions 13 and 14, respectively, which are affixed to each other by any suitable means. A cylinder bore 15 is formed within the cylinder block 12 and extends through both the upper and lower block portions 13 and 14. A piston 16 reciprocates within the bore 15 and is pivotally connected to the small end of a connected rod 17 by means of a piston pin. The big end of the connecting rod 17 is rotatably journaled about the throw of a crankshaft that is indicated by the reference numeral 18 and is rotatably journaled within a crankcase chamber 19.

The crankcase chamber 19 is formed by the lower portion of the lower block 14 and a crankcase member 21 that is affixed to the lower block 14 by any suitable means.

A supply of atmospheric air is delivered to the crankcase chamber 19 by an induction system that is indicated by the reference numeral 22. The induction system 22 is composed of an intake passage 23 in which is positioned a butterfly-type throttle valve 24 which regulates the air flow through the intake manifold 23 and is manually controlled by a twist grip 25. The intake manifold 23 delivers the atmospheric air to an intake passage 26 that is formed along one side of the engine lower block portion 14 and opens to the crankcase chamber 19. A reed type check valve 27 is positioned in the intake passage 26 and operates to preclude reverse air flow in a known manner.

Fuel is supplied to the air charge admitted as thus far described by a fuel injector that is indicated by the reference numeral 28. The fuel injector 28 receives a supply of fuel from a fuel tank (not shown) and injects the fuel into the intake manifold 23 downstream of the throttle valve 24. The fuel injector 28 is controlled by an electronic control means that is indicated by the reference numeral 29 and will be discussed in detail later.

One or more scavenge passages 31 are formed within the engine block 12 in both the upper and lower block portions 13 and 14. One or more of the scavenge passages 31 terminate at their lower ends in the intake passage 26 downstream of the reed valve 27 and they all opens to the crankcase chamber 19. At their upper ends, the scavenge passages 31 open to the cylinder bore 15.

A cylinder head is indicated by the reference numeral 32 and is affixed to the top surface of the engine block in closing relation to the cylinder bore 15 in any known manner. The cylinder head 32 defines a recess which operates with the cylinder bore 15 and the head of the piston 16 to form a combustion chamber 33 whose volume varies cyclicly with the motion of the piston 16. A spark plug 34 is mounted in the cylinder head 32 and has its gap extending into the combustion chamber 33. The spark plug 34 is fired by an ignition control circuit that is not shown.

An exhaust passage 35 is formed within the engine block 12 and opens to the cylinder bore 15 at a longitudinal position that is slightly above and on the opposite side of the opening of the scavenge passage 31. The exhaust passage 35 terminates at an exhaust manifold 36 which routes the exhaust gases through an exhaust system (not shown) for purification before being expelled to the atmosphere.

The above-described engine 11 operates in the following manner. Upward motion of the piston 16 draws atmospheric air and injected fuel from the fuel injector 28 through the induction system 22 and into the crankcase chamber 19 past the reed valve 27. The reed valve 27 is open at this point, since the pressure in the induction system 22 is greater than the pressure in the crankcase chamber 19.

Sometime after the piston 16 passes top dead center (TDC), the pressure in the crankcase chamber 19 will exceed the induction pressure and the reed valve 27 will close. The air/fuel mixture in the crankcase chamber 19 is then compressed by the piston 16 during its downstroke until the scavenge passages 31 are exposed to the combustion chamber 33. At this point, the compressed air/fuel mixture enters the combustion chamber 33 through the scavenge passages 31 and is further compressed by the ensuing compression stroke of the piston 16.

At some point before top dead center (TDC), the spark plug 34 is fired and the air/fuel mixture ignites, burns and expands. This forces the piston 16 downwardly and, thus, drives the crankshaft 18. Continued downward motion of the piston 16 exposes the exhaust passage 35 to the combustion chamber 33 and, thus, permits the combustion gases to be expelled from the combustion chamber 33 through the exhaust passage 35.

The electronic control means will now be described in detail. As previously stated, the control means controls the operation of the fuel injector 28 or, more specifically, the injection pulse timing and duration of the fuel injector 28 for each engine induction cycle. For this purpose, there are provided a number of engine condition sensors.

An intake air pressure sensor 37 is positioned in the intake manifold 23 and outputs a signal that is indicative of the intake air pressure upstream of the check valve 27 to the control means 29. A crankcase chamber pressure sensor is indicated by the reference number 38 and is positioned in the crankcase member 21. The crankcase pressure sensor 38 outputs a signal that is indicative of the pressure in the crankcase 19 downstream of the check valve 27 to the control means 29.

A crankshaft position sensor 39 is also positioned in the crankcase member 21 and associated with the crankshaft 18 so as to output a signal to the control means that is indicative of the crankshaft. By counting the pulses from this sensor in a unit time the engine speed in revolutions per minute (rpm) may also be measured.

Lastly, a throttle position sensor is indicated by the reference numeral 41 and associated with the twist grip 25. The throttle position sensor 41 outputs a signal to the control means that is indicative of the demand or load on the engine 11. While the throttle position sensor 41 is described as being in association with the twist grip 25 it may be alternatively mounted to the throttle valve 24 as is also shown in FIG. 1 in phantom and indicated by the reference numeral 41a.

Based on the input signals from the above sensors, the control means determines the fuel injection timing for the engine 11. A problem exists, however, in that based on the above signals the control means may inject some or all of the fuel into the induction system when the reed valve 27 is closed. Under these circumstances, the air/fuel ratio in the combustion chamber 33 will be excessively lean. Also, the fuel remaining in the induction system 22 upstream of the reed valve 27 will impinge upon the reed valve 27 while no longer in an atomized state and accumulate on the reed valve 27 and also on the walls of the intake manifold 23 and the intake passage 26 and later mix with the air from subsequent engine combustion cycles causing the air/fuel ratio to fluctuate. An embodiment of this invention prevents this adverse condition by utilizing an electronic control means 29 that fixes the ignition timing in conjunction with the opening and closing of the reed valve 27.

Figure 2:
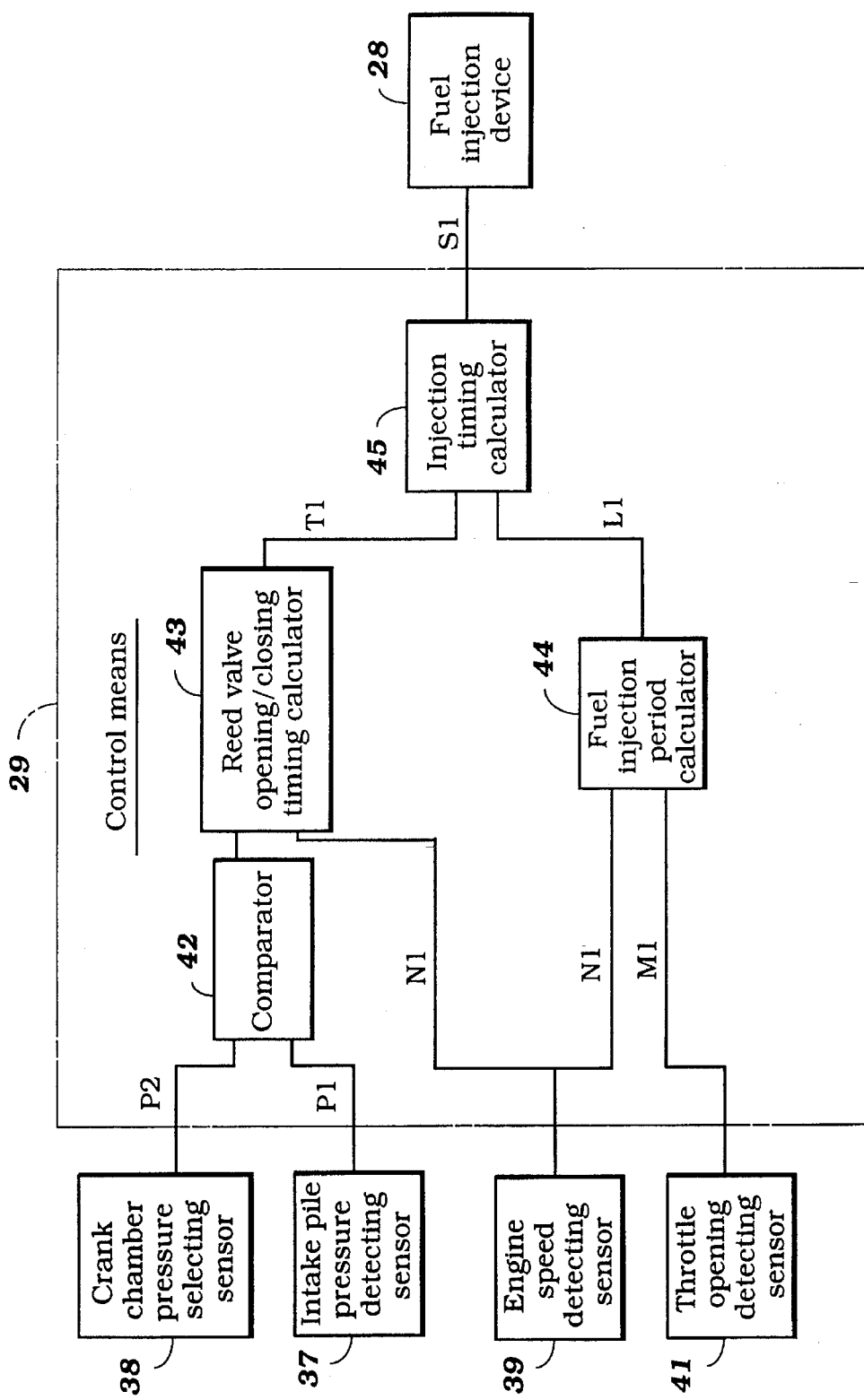
FIG. 2 is a block diagram that illustrates a fuel injection control means for the engine.

With reference now to FIG. 2, it is seen that the control means 29 includes a comparator 42 which receives signals indicative of the induction pressure P1 and the crankcase pressure P2 from the pressure sensors 37 and 38 respectively to determine the pressures acting to open or close the reed type valve 27. The comparator 42 compares P1 to P2 to determine the status of the reed valve 27. If P2 is greater than or equal to P1 then the reed valve is closed while P2 is less than P1 by more than a predetermined amount then the reed valve is opened to a degree that is dependent upon the pressure gradient between P2 and P1. The comparator 42 outputs a signal indicative of the reed valve status to a reed valve opening/closing timing calculator 43 that also receives a signal from the engine speed sensors 39 indicative of the engine speed N1 in rpm. Based on these two signals, the reed valve timing calculator 43 can determine the opening and closing time of the reed valve 27.

The engine speed N1 is also conveyed to a fuel injection period calculator that is indicated by the reference numeral 44. A further signal M1 indicative of the engine load is received by the fuel injection period calculated 44 from the throttle position sensor 41 and used in conjunction with the signal N1 to calculate the duration of the fuel injection pulse for the given engine operating conditions.

The signals T1 indicative of the opening and closing time for the reed valve 27 and L1 indicative of the fuel injection pulse duration are sent by the reed valve timing calculator 43 and the fuel injection period calculator 44 respectively to an injection timing calculator 45 which determines the injection timing S1 for the fuel injector 28 and actuates the fuel injector 28 accordingly.

Figure 3:
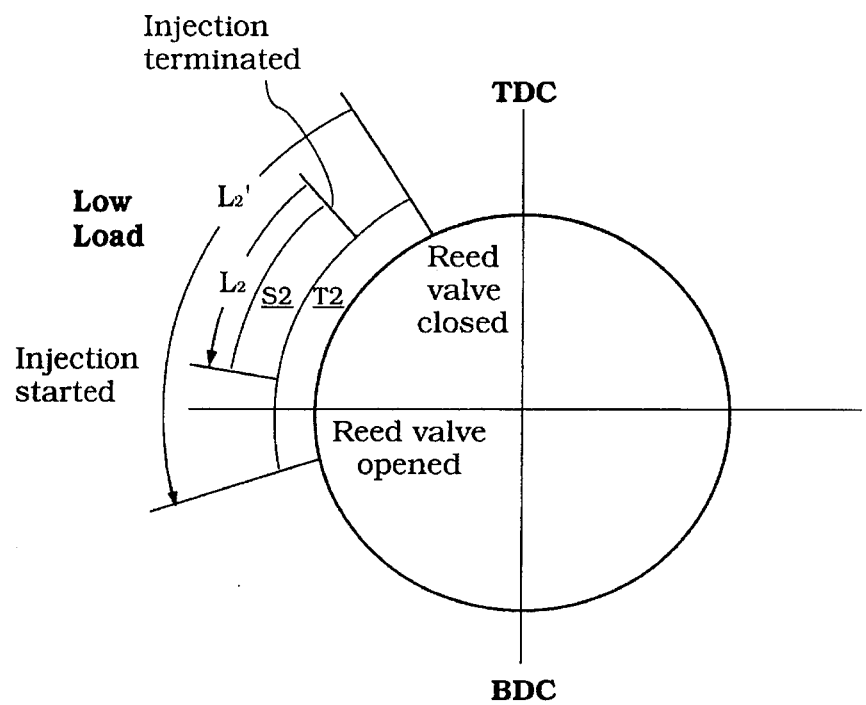
FIG. 3 is a timing chart that illustrates the injection timing for an engine in a low-load operating condition.
Figure 4:
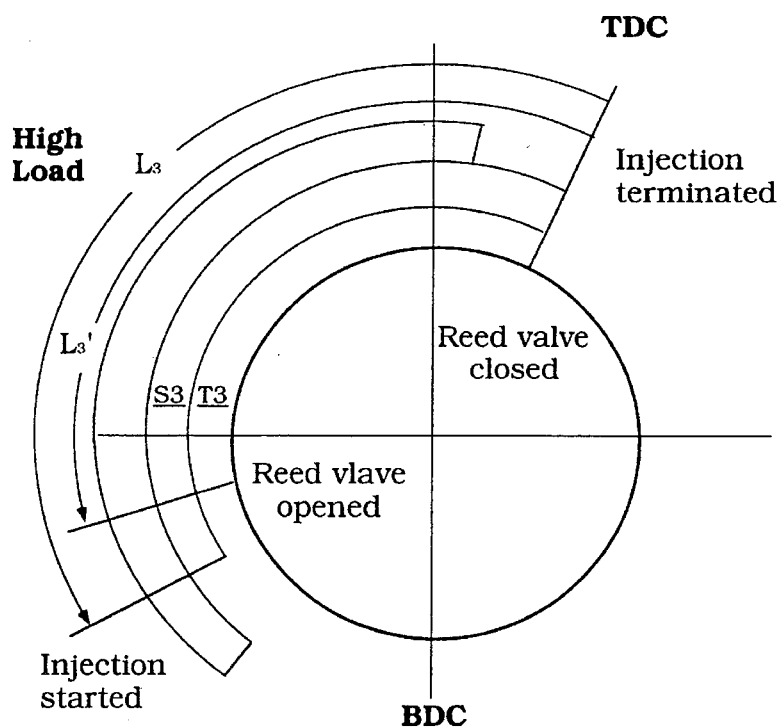
FIG. 4 is a timing chart that illustrates the injection timing for an engine in a high-load operating condition.

As seen in FIGS. 3 and 4, this timing S1 is determined by the injection timing calculator 45 so that most if not all of the fuel injection pulse occurs while the reed valve 27 is open. More specifically, the injection timing calculator 45 calculates a timing S1 where the fuel injection pulse is terminated no later than the time at which the reed valve 27 is closed.

FIG. 3 shows a fuel injection timing for an engine 11 in a low-load operating condition. The reed valve timing is indicated by T2 which shows the valve 27 opening at the bottom dead center (BDC) and closing before top dead center (TDC). Thus, the fuel injection pulse may occur at any time within the L2' period and be free of undesired fuel accumulation in the induction system 22. Since the engine 11 is operated under a low-load condition, the calculator injection pulse duration L2 easily falls within the bounds of the L2' range and the fuel injection timing S2 is positioned by the control means 29 such that the fuel injection is started and terminated while the reed valve 27 is open.

FIG. 4 shows the fuel injection timing for an engine operating in a high load condition. In this case the reed valve timing is indicated by T3 and shows the reed valve 27 opening after bottom dead center and closing after top dead center. Thus, fuel injection pulse may occur at any time within the L3' period without any adverse effects. However, in this instance, since the engine 11 is in a high load operating condition, the calculated injection pulse duration L3 is greater than L3' which means that some of the fuel injection pulse will occur when the reed valve 27 is closed. The fuel injection timing S3 is then positioned by the control means 29 such that the injection pulse terminates when the reed valve 27 closes. This means that the injection pulse begins before the reed valve 27 opens and that some fuel may accumulate on the reed valves 27 and the walls of the induction system 22. This accumulation is minimized, however, and upon the subsequent opening of the reed valve 27 the resulting air flow will carry the accumulated fuel into the crankcase 19. Thus, even though adverse conditions are once again encountered, their effect on the engine operation and more specifically on the desired air/fuel ratio in the combustion chamber 33 is minimized.

Figure 5:
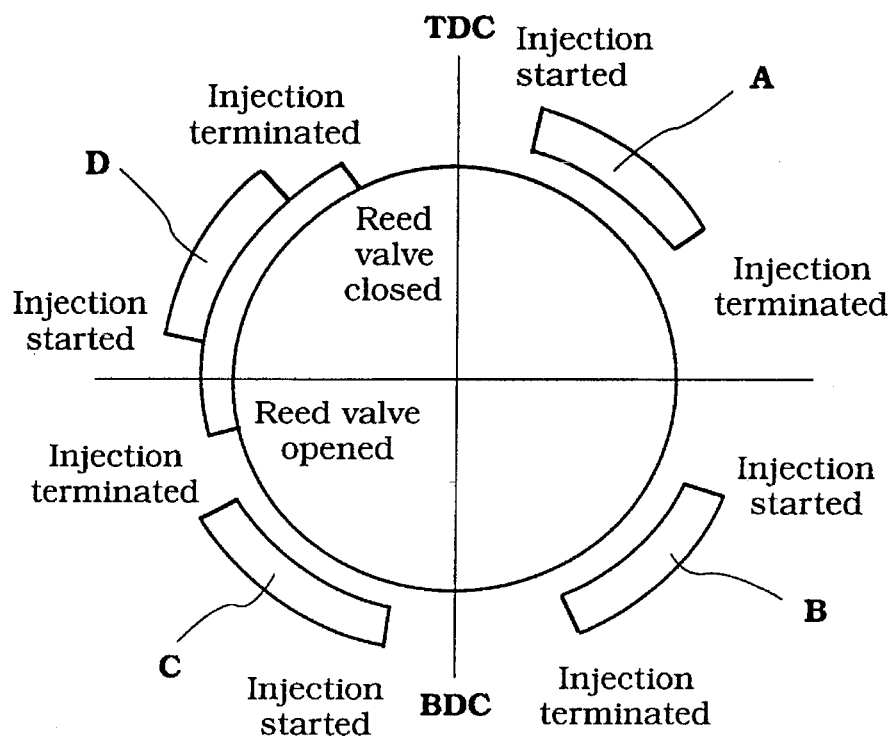
FIG. 5 is a timing chart that illustrates the injection timing for an engine in a transient operating condition.
Figure 6:
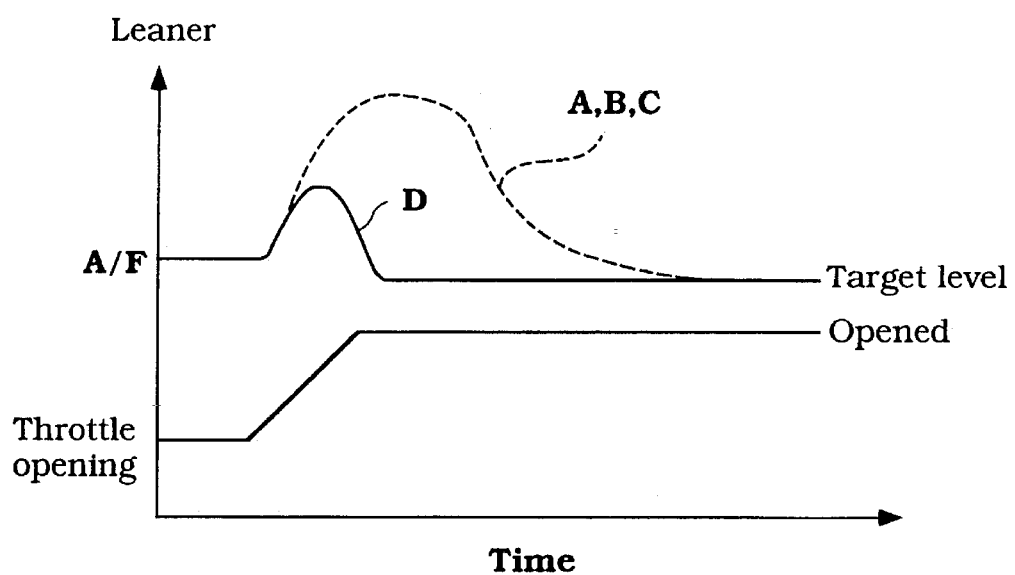
FIG. 6 is a graph which shows the relationship between the air/fuel mixture ratio and the throttle position for the injection timings of FIG. 5.

The air/fuel ratio in the combustion chamber 33 is also affected when the throttle valve angle is changed. This is shown in FIGS. 5 and 6 for the transient condition where the throttle valve 24 is opened to accelerate the engine from a low-speed operating condition to a higher speed operating condition and then held at the higher speed operation condition. In FIG. 5, it is seen that four different injection timings are indicated by the reference letters A, B, C, and D at which the throttle valve angle is changed and each of the timings occurs in a different angle quadrant measured relative to top dead center. Injection timings A–C occur with the reed valve 27 closed while injection timing D occurs in its entirety with the reed valve 27 opened.

As can be seen in FIG. 6, the air/fuel ratio for the injection timing D increases initially due to the inertia of the air/fuel mixture in the induction system 22 but quickly decreases and reaches the desired enriched target level shortly after the throttle opening angle is fixed at its higher engine speed value. The air/fuel ratio for the injection timings A-C increases substantially more, however, and does not decrease to the desired target level until a significant period of time has elapsed. This delayed response occurs because the reed valve 27 is closed when the fuel is injected into the induction system 22. This means that the fuel will adhere to the reed valve 27 and the walls of the induction system 22. This results in a leaner mixture in the combustion chamber 33 as indicated by the dashed line of the figure.

Thus, the control means 29 utilized in the invention not only minimizes the accumulation of fuel particles on the reed valve 27 and the walls of the induction system 22 but also minimizes the response time of the engine 11 in transient operating conditions.

Figure 7:
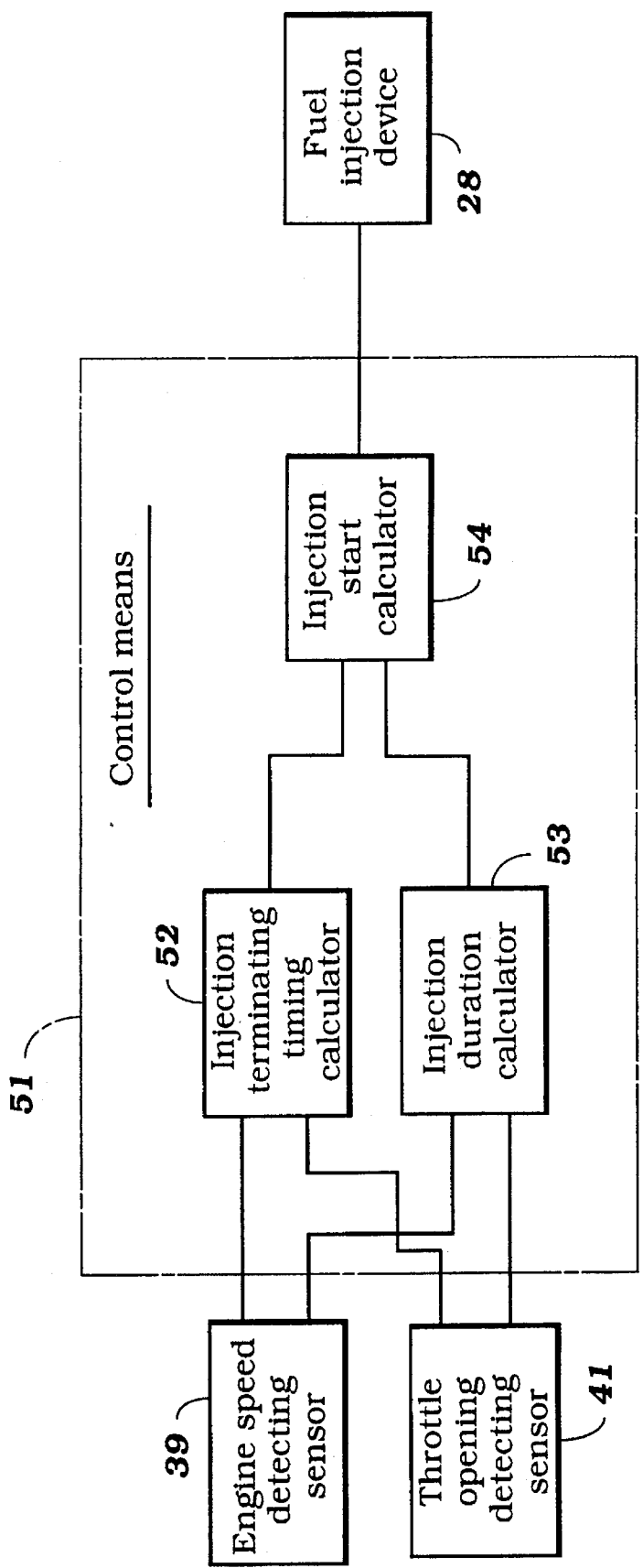
FIG. 7 is a block diagram similar to FIG. 2 and illustrates a further fuel injection control means for the engine.

FIG. 7 illustrates a further control means 51 which utilizes an injection timing that is determined based on engine load and speed only. The control means 51 includes an injection terminating timing calculator 52 which receives signals indicative of the engine speed in rpm and engine load from the speed sensor 39 and throttle position sensor 41, respectively. Based on these two signals, the injection terminating timing calculator 52 can determine the fuel injection pulse termination timing by referencing an internal map stored in memory (not shown). This internal map is generated from actual engine running measurements which enables the control means 51 to determine when the reed valve 27 opens and closes which, in turn, establishes the fuel injection pulse termination time.

The engine speed sensor 39 and throttle position sensor 41 also signal an injection timing calculator 53 which determines the injection pulse duration based on these signals by referencing a further map stored in memory which correlates pulse duration with the given engine operating conditions. This information along with the injection pulse terminating timing is signaled to an injection period calculator 54 which then determines the injection timing and actuates the fuel injector 28 accordingly. Thus, the above control means 51 provides the same functionality as the previous control means but allows for the use of fewer sensors which reduces both the cost and complexity of the injection control system.

While the above embodiment is seen to utilize engine speed and load as the means for determining the fuel injection timing, it should be noted that other combinations of sensors may be employed for this purpose. For example, the crankcase pressure and the engine speed may be used in conjunction with an internal map stored in memory to determine the fuel injection timing.

Also, the system may be employed with various other induction control layouts. For example, FIG. 1 shows a further induction system layout where the fuel injector 28 is mounted in the intake manifold 23 upstream of the throttle valve 24 and shown in phantom. While this is a less than ideal position for the fuel injector 28 since fuel will also impinge and accumulate on the throttle valve 24, a control means can be provided which functions in accordance with the desired aims of the invention for the above induction system layout.

It should be apparent that the above described control means define a fuel injection timing that minimizes fluctuation in the induction charge air/fuel ratio caused by fuel accumulating on the reed valve and the walls of the induction system in those instances where fuel injector operation overlaps the closing of the reed valve. Of course, the foregoing description is that of preferred embodiments of the invention, and various changes and modifications may be made without departing from the spirit and scope of the invention, as defined by the appended claims.

What is claimed is:

1. An internal combustion engine having a combustion chamber, an intake passage for supplying an air charge to said combustion chamber, a reed type valve disposed in said induction passage for controlling the flow therethrough in response to pressure differences, a fuel injector disposed in said induction passage upstream of said reed type valve for injecting fuel into said induction passage, control means for sensing an engine condition and controlling the amount of fuel injected by said fuel injector, means for determining when the reed type valve closes at the end of an induction cycle, and means for terminating the fuel injection at a time not substantially later than the time when the closing of the reed type valve is determined.

2. An internal combustion engine as set forth in claim 1, wherein the closing of the reed type valve is determined by the pressure across the reed type valve.

3. An internal combustion engine as set forth in claim 1, wherein the determination of the closing of the reed type valve is determined by engine running conditions.

4. An internal combustion engine as set forth in claim 3, wherein the engine running conditions utilized to determine the closing of the reed type valve comprises engine speed.

5. An internal combustion engine as set forth in claim 3, wherein the means for determining the closing of the reed type valve comprises engine load.

6. An internal combustion engine as set forth in claim 5, wherein the means for determining the closing of the reed type valve further comprises engine speed.

7. An internal combustion engine as set forth in claim 1, wherein the fuel injection is terminated under substantially all running conditions before the reed type valve is closed.

8. An internal combustion engine as set forth in claim 7 wherein fuel injection is begun before the reed type valve is opened at high load conditions.

9. An internal combustion engine as set forth in claim 8 wherein at least some of the fuel is injected when the reed type valve is open.

10. An internal combustion engine as set forth in claim 1, wherein the engine is a two-cycle crankcase compression internal combustion engine and the induction passage serves a crankcase chamber of the engine and wherein the reed type valve is disposed upstream of the crankcase chamber in the induction system.

11. An internal combustion engine as set forth in claim 8, wherein the closing of the reed type valve is determined by the pressure across the reed type valve.

12. An internal combustion engine as set forth in claim 8, wherein the determination of the closing of the reed type valve is determined by engine running conditions.

13. An internal combustion engine as set forth in claim 10, wherein the engine running conditions utilized to determine the closing of the reed type valve comprises engine speed.

14. An internal combustion engine as set forth in claim 11, wherein the engine running conditions utilized for determining the closing of the reed type valve comprises engine load.

15. An internal combustion engine as set forth in claim 12, wherein the engine running conditions utilized for determining the closing of the reed type valve further comprises engine speed.

16. An internal combustion engine as set forth in claim 8, wherein the fuel injection is terminated under substantially all running conditions before the reed type valve is closed.

17. An internal combustion engine as set forth in claim 16 wherein fuel injection is begun before the reed type valve is opened at high load conditions.

18. An internal combustion engine as set forth in claim 17 wherein at least some of the fuel is injected when the reed type valve is open.

19. A method of operating an internal combustion engine having a combustion chamber, an intake passage for supplying an air charge to said combustion chamber, a reed type valve disposed in said induction passage for controlling the flow therethrough in response to pressure differences, a fuel injector disposed in said induction passage upstream of said reed type valve for injecting fuel into said induction passage, said method comprising the steps of sensing an engine condition, controlling the amount of fuel injected by said fuel injector, determining when the reed type valve closes at the end of an induction cycle, and terminating the fuel injection at a time not substantially later than the time when the closing of the reed type valve is determined.

20. A method of operating an internal combustion engine as set forth in claim 19, wherein the closing of the reed type valve is determined by the pressure across the reed type valve.

21. A method of operating an internal combustion engine as set forth in claim 19, wherein the determination of the closing of the reed type valve is determined by engine running conditions.

22. A method of operating an internal combustion engine as set forth in claim 21, wherein the engine running conditions utilized to determine the closing of the reed type valve comprises engine speed.

23. A method of operating an internal combustion engine as set forth in claim 21, wherein the determination of the closing of the reed type valve is based upon engine load.

24. A method of operating an internal combustion engine as set forth in claim 23, wherein the determination of the closing of the reed type valve is further based upon engine speed.

25. A method of operating an Internal combustion engine as set forth in claim 19, wherein the fuel injection is terminated under substantially all running conditions before the reed type valve is closed.

26. A method of operating an internal combustion engine as set forth in claim 25 wherein fuel injection is begun before the reed type valve is opened at high load conditions.

27. A method of operating an internal combustion engine as set forth in claim 26 wherein at least some of the fuel is injected when the reed type valve is open.

* * * * *